P. B. BREEDEN.
COMBINED RAKE AND PITCHFORK.
APPLICATION FILED NOV. 15, 1912.
1,061,217.
Patented May 6, 1913.
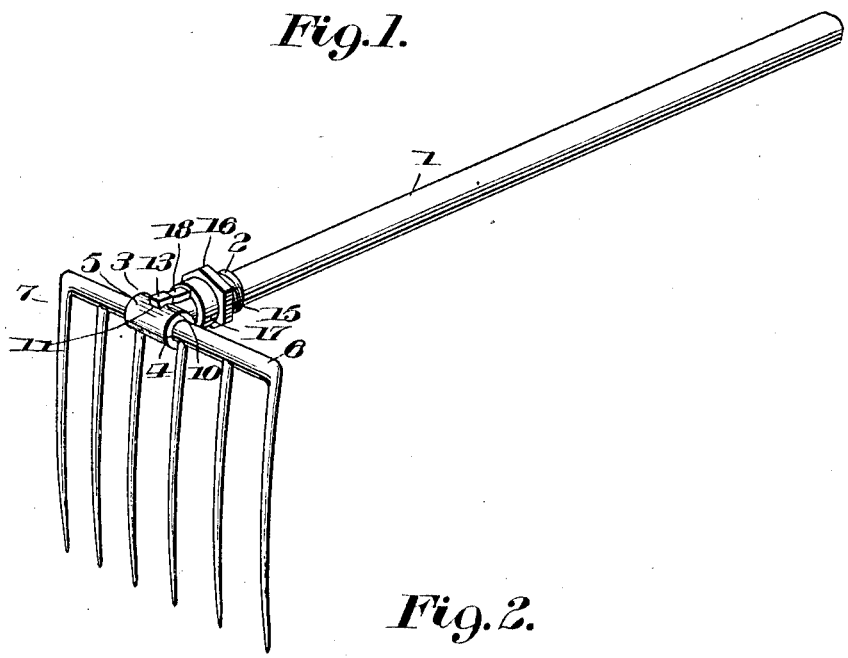
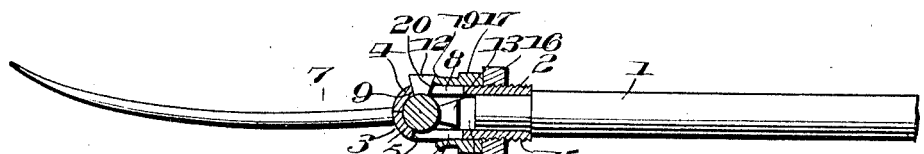
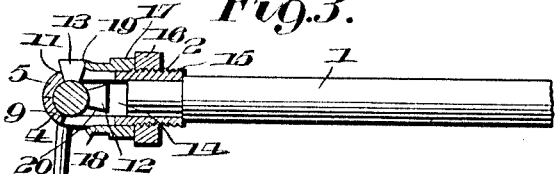
Witnesses
M. H. Slifer
James R. Korless
Inventor
Prince B. Breeden
By Victor J. Evans
Attorney

UNITED STATES PATENT OFFICE.

PRINCE B. BREEDEN, OF NORFOLK, VIRGINIA.

COMBINED RAKE AND PITCHFORK.

1,061,217.   Specification of Letters Patent.   Patented May 6, 1913.

Application filed November 15, 1912. Serial No. 731,616.

*To all whom it may concern:*

Be it known that I, PRINCE B. BREEDEN, a citizen of the United States, residing at Norfolk, in the county of Norfolk and State of Virginia, have invented new and useful Improvements in Combined Rakes and Pitchforks, of which the following is a specification.

This invention relates to a combined rake and pitch fork; and has for an object to provide a head which may be adjusted angularly of the handle and securely held in its required adjusted position, so that in one position it may be used as a rake while in another position it may be used as a pitch fork.

Another object of the invention is to provide means for determining fixed adjustments of the head with relation to the handle and for facilitating the adjustments of the head.

With these and other objects in view, the invention consists of certain novel features of construction, combination and arrangement of parts, as will be hereinafter described and claimed.

In the accompanying drawings:—Figure 1 is a perspective view of the device; Fig. 2 is a longitudinal section therethrough, showing the head adjusted to a position for use as a pitch fork; and Fig. 3 is a view similar to Fig. 2, showing the head adjusted to a position for use as a rake.

The handle 1 herein illustrated is provided at one end with a fixed sleeve 2, which terminates beyond the end of the handle in a socket 3 of split portions 4 and 5, said portions being adapted to be sprung around the bar 6 of the head 7 whereby to permit of free rocking movement of the head according to the angular adjustment thereof which may be desired. The portion 4 is provided with a slot 8 having a stop shoulder 9 for a purpose to be hereinafter described. A similar slot 10 in the portion 5 terminates in a shoulder 11, which is disposed immediately opposite the first shoulder 9.

As stated the head 7 is adapted for rocking adjustments on the handle 1 and in view thereof, and in order that the head may be positively retained in different adjusted positions, I provide the bar 6 with radially projecting lugs 12 and 13. The shoulder 11 of the slot 10 is disposed in the direct path of the lug 13, and is adapted to engage therewith when the head 7 is adjusted for use as a rake, the slot 10 being designed to accommodate movements of the lug 13 toward and away from said shoulder 11, as is evident. The shoulder 9 is adapted to come in mutual contact with the lug 12 of the bar 6 and thereby limit the pivotal or rocking adjustment of the head 7 in one direction and permit said head to be operatively associated with the handle in the form of a pitch fork. The handle 1 has one of its terminals spaced from the bar 6, so as to provide an intervening recess 14 therebetween to singly accommodate the lugs 12 and 13. The sleeve 2 is exteriorly threaded, as at 15, through a portion of its length and designed to accommodate a correspondingly threaded clamping nut 16. A retaining collar 17 is slidable on the sleeve 2 forwardly of the threaded portion 15 thereof and immediately in advance of the clamping nut 16. A flared outer portion 18 of the collar is adapted to partly embrace the walls of the socket 3, as shown particularly in Figs. 2 and 3 of the drawings. When the collar is in the position shown in Fig. 2, the edge 19 thereof is in contact with a flared wall 20 of the lug 12. The clamping nut 16 is adjusted to bear against the collar 17 and to move the latter in a direction to insure such contact of the edge 19 with said lug 12, as will confine the latter against the shoulder 9. The head 7 is then held longitudinally in a fixed position upon the handle 1. The lug 13 being concealed in the recess 14 between the bar 16 of said head 7 and an adjacent end of the handle 1. When the lug 12 is arranged in the recess 14, the other lug 13 will be projected through the slot 10 and seated against the shoulder 11 and confined against the latter by adjusting the nut 16 and collar 17 in the previously described manner.

The construction of the device is such that different adjustment of the head 7 may be made according to the character of the work to be performed and in effect the tool presents such combination of elements as will facilitate the adjustment of the head to the variously described positions and insures holding the head rigidly fixed in its adjusted position.

Having thus described my invention, what I claim is:—

A handle having a sleeve secured thereto and terminating beyond the end of the handle in a socket, the said socket having its walls provided with oppositely disposed slots, a head mounted for rocking movements in the socket and provided with a plurality of radial lugs, one of the lugs being adapted to engage with one of the walls of one of said slots on one adjustment of the head, the other lug being adapted to engage with one of the walls of the other slot on another adjustment of the head, and means adjustably mounted on the sleeve and adapted to singly engage with the lugs.

In testimony whereof I affix my signature in presence of two witnesses.

PRINCE B. BREEDEN.

Witnesses:
GUY IRVIN MCLEAN,
WILLIAM D. MARTIN.

Copies of this patent may be obtained for five cents each, by addressing the "Commissioner of Patents, Washington, D. C."